May 11, 1926.
N. E. METHLIN
1,584,182
CORRECTOR FOR FIRE CONTROL SYSTEMS
Filed Oct. 21, 1924
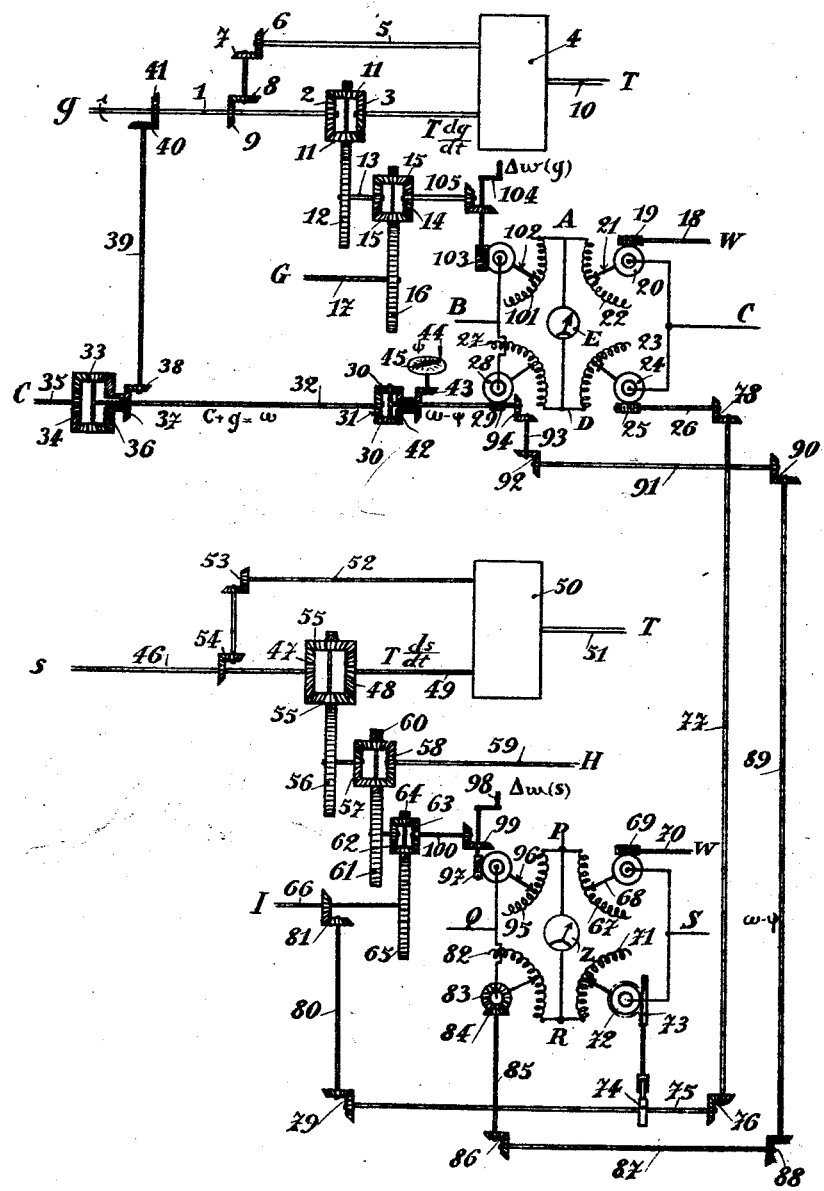

Patented May 11, 1926.

1,584,182

UNITED STATES PATENT OFFICE.

NICOLAS EMILIEN METHLIN, OF PARIS, FRANCE, ASSIGNOR TO SCHNEIDER & CIE., OF PARIS, FRANCE, A FRENCH COMPANY.

CORRECTOR FOR FIRE-CONTROL SYSTEMS.

Application filed October 21, 1924. Serial No. 745,035.

The aiming of a gun depends essentially on the conjugation of the gun, either directly or at a distance, with an apparatus for aiming of which the line of sight is directed upon the target, this conjugation being completed by the introduction of divers correcting factors, which has the effect of destroying the parallelism between the axis of the gun and of the line of sight.

In the particular case of firing on board a vessel, the following considerations have to be taken into account.

1. In direction:—
Bearing of the line of sight;
Direction of the ship's head;
Kinematic correction of relative displacement in direction;
Atmospheric corrections in direction.

2. In height:—
Site angle of target;
Kinematic correction of relative displacement in site:
Angle of elevation;
Atmospheric correction for height.

Again, it is desirable that the aiming of guns be maintained in as continuous a manner as possible. This condition implies not only the permanent maintaining of the line of sight on the target, but also the continuous introduction of all the other factors with their value at the moment, and the instantaneous and automatic resolution of the firing equations.

Let: G be the bearing of the gun, $g$ the bearing of the line of sight, $c$ the direction of the ship's head, $\frac{dg}{dt}$ the speed of variation of the bearing, T the duration of future travel, $\Delta_w(g)$ the wind correction for direction, I the inclination of the gun, $s$ the site angle of the line of sight, $\frac{ds}{dt}$ the speed of variation of the site angle, H the future angle of elevation, $\Delta_w(s)$ the wind correction for elevation.

$g$ and $s$ are transmitted directly or from a distance by the sighting telescope.

$c$ is indicated by a gyroscopic or other member.

T and H are transmitted from a distance by a calculator of future tangent elevations.

$\Delta_w(g)$ and $\Delta_w(s)$ are given by the known formulæ, $$\Delta_w(g) = \frac{-W \sin(\omega - \psi)}{V_e \cos I}$$

$$\Delta_w(s) = \frac{-W \cos(\omega - \psi)}{V_e f(I)}$$

where $\omega$ is the azimuth of the line of sight, and algebraic sum of the bearing and the head $g+c$; $V_e$ the initial speed at the moment; I the final inclination of the gun; W the speed of the wind; $\psi$, the azimuth of the direction of the wind.

The equations are then:

$$G = g + T\frac{dg}{dt} + \Delta_w(g)$$

$$I = s + T\frac{ds}{dt} + H + \Delta_w(s)$$

This invention relates to an apparatus for solving these equations in a continuous manner.

One form of construction is illustrated by way of example on the accompanying drawings in which:—

An axle 1 turns proportionally to the bearing $g$ transmitted from the point where the sighting apparatus is installed. This axle 1 drives through the transmission 9—8—7—6—5, a special tachometer 4 which also receives the reading of the duration of travel T transmitted by the axle 10 operated from a distance by a calculator of distances and durations of travel, of any known kind. The planet wheels 11 of the differential connecting the axle 1 to a shaft originating from the tachometer turn proportionally therefore to the quantity $$g + T\frac{dg}{dt}.$$

The wind correction in direction is given by the intermediary of a Wheatstone bridge A—B—C—D, receiving current at B and C and comprising:—

A resistance 22 proportional to W regulated by a cursor 21 driven by means of an axle 18, by the intermediary of a worm 19 and a worm wheel 20. The displacement of the axle 18 is a function of W;

A resistance 23 which varies according to the cosine of I regulated by a cursor 24 as a function of I determined elsewhere, the said cursor being driven by a transmission communicated from the shaft 66 to the worm 25 driving the worm wheel attached to the cursor.

A resistance 27 which varies according to a sin function of which the cursor 28 is driven as a function of $\omega-\psi$ introduced by means of a screw 29 attached to the planet wheels 30 of a differential of which a pinion 42 is moved as a function of $\psi$ by a handle 44 of a dial 45. The other pinion 31 is driven by the axle 32 which turns as a function $\omega$, being driven by a differential 33—34—36 receiving $c$ by the axle 35 conjugated with the indicator of the ship's head, and $g$ by the transmission 38—39—40—41;

A resistance 101 traversed by a cursor 102 driven by the handle 104 operated by a gunner to keep the needle of the voltmeter E at zero.

With a suitable regulation of the resistances, we have the relation:

$$\frac{\text{resistance } 101}{\sin(\omega-\psi)} = \frac{-W}{\cos I}$$

in which the resistance $101 = K \times V_e \times \Delta_w(g)$, $V_e$ being constant, the handle 104 turns as a function of $\Delta_w(g)$.

The rotation is transmitted by the gearing by the bevel pinion 105 to the pinion 14 of a differential of which the other pinion 13 is driven as a function of $$g + T\frac{dg}{dt}$$

by the wheel 12 engaging with the planet wheels 11. The planet wheels 15 together with the wheel 16 and the shaft 17 thus turn as a function of G.

The angle of site $s$ is transmitted from a distance to the axle 46 which drives the tachometer 50 on one hand by the transmission 53—52, and on the other hand, the pinion 47 of a differential of which the other pinion 48 turns as the function of $$T\frac{ds}{dt}$$

The planet wheels 55 turn as a function of $$s + T\frac{ds}{dt}$$

and transmit this movement through the wheel 56 to the pinion 57.

The wind correction for elevation is given, like that for direction, by a Wheatstone bridge P—Q—R—S receiving current at Q and S comprising:

—A resistance 67 which is varied as a function of W, transmitted to the cursor 68 by the worm 69 attached to the axle 70.

—A resistance 71 varying as a function $f(I)$ by the displacement of a cursor 72 driven by a rack 73, which is itself displaced by a cam 74, whose outline is suitably determined according to firing tables and which is rotated by the shaft 75 which is made to turn as a function of I by the transmission 81—80—79;

The same shaft transmits the value of I to the resistance 23 of the bridge A—B—C—D by the transmission 76—77—78;

A resistance 82 which varies according to $\cos(\omega-\psi)$ regulated as a function of $(\omega-\psi)$ by the mechanism 84—85—86—87—88—89—90—91—92—93—94;

—A resistance 95 hand regulated by the handle 98 of which the rotation, ensured in order to keep the needle of the voltmeter Z at zero, is a function of $\Delta_w(s)$;

The differential 57—58—60 ensures the summation of $$s + T\frac{ds}{dt}$$

transmitted to 57 and of H introduced by the axle 59 which turns according to the displacement of an elevating cam not shown and driven from a distance by the calculator of distances.

The planet wheels 60 turning according to $$s + T\frac{ds}{dt} + H$$

combine their movement with that of the handle 98 by means of the differential 62—63—64, to give the planet wheels 64 a movement proportional to $$s + T\frac{ds}{dt} + H + \Delta_w(s)$$

that is to say to I, a movement transmitted by 65 and to the axle 66 of the inclination transmitter and, by 81—80—79, to the shaft 75 which introduces the factor I into the two bridges.

The exact value of the angles G and I of aiming of the guns, is thus materialized in a continuous manner.

The auxiliary apparatus, particularly the multiplying tachometers 4 and 50 may be of any known type whatever.

Having now particularly described and ascertained the nature of our said invention and in what manner the same is to be performed, we declare that what we claim is:—

1. A corrector of the class described, comprising a Wheatstone bridge, a voltmeter therefor, movable contacts for the resistances of said bridge, means for moving one of said contacts as a function of the speed of the wind, means for moving another of said contacts as a function of the final inclination of the gun, means for moving another of said contacts as a function of the azimuth of the line of sight minus the azimuth of the direction of the wind ($\omega - \psi$), manual means for moving the contact of the fourth resistance to maintain the voltmeter at zero reading, a motion-transmitting member, and means operatively connected to said member and said manually operable means for rotating said member in accordance with the bearing angle to be given the gun.

2. Apparatus for controlling the laying of a gun comprising a Wheatstone bridge, a voltmeter, movable contacts for the resistance arms of said voltmeter, means for moving one of said contacts as a function of the speed of the wind, means for moving one of said contacts as a function of the final inclination of the gun, means for moving one of said contacts as a function of the azimuth of the line of sight minus the azimuth of the direction of the wind, ($\omega - \psi$), manual means for rotating the fourth contact to maintain the voltmeter at zero reading, a motion-transmitting member and means operatively connected to said motion-transmitting means and manual member for rotating the latter proportionally to the final inclination of the gun.

3. A corrector for controlling the firing of guns on board a vessel whereby the equations giving the bearing of the guns and the final inclination of the same are solved in a continuous manner, comprising means for transmitting the bearing of the line of sight, means for transmitting the duration of travel, a Wheatstone bridge including four resistance arms, contacts for each of said arms and a voltmeter, means for moving one of said contacts as a function of the speed of the wind, means for moving another of said contacts as a function of the final elevation of the gun, means for moving another of said contacts as a function of the azimuth of the line of sight minus the azimuth of the wind, ($\omega - \psi$), manual means for moving the fourth contact to maintain the voltmeter at zero reading, and motion-transmitting means operatively connected to said manually operable means and said first and second means.

4. A corrector for controlling the fire of a gun mounted on board a vessel, comprising a tachometer, a Wheatstone bridge, a voltmeter for said Wheatstone bridge, means for imparting motion to the tachometer proportionally to the bearing of the line of sight and the duration of travel, manually operable means for maintaining the voltmeter at zero reading, and means operatively connecting the tachometer to said manually operable means.

5. A corrector for controlling the fire of a gun mounted on a vessel, comprising means for securing the wind correction in direction including a Wheatstone bridge, a voltmeter and movable contacts for the resistances of said bridge, means for securing the wind correction for elevation including a Wheatstone bridge, a voltmeter and a plurality of contacts for the resistances of said bridge, means for moving one contact of each of said bridges as a function of the speed of the wind, means for moving the second contact of each of said bridges as a function of the final inclination of the gun, means for moving the third contact of each of said bridges as a function of the bearing of the line of sight, the direction of the vessel's head and the azimuth of the direction of the wind, manually operable means for moving the fourth contact of each of said bridges to maintain the voltmeters thereof at zero reading, and means operatively connected to said manually operable means for transmitting the bearing of the gun, G, and the final elevation of the gun, I.

In testimony whereof I have signed this specification.

NICOLAS EMILIEN METHLIN.